(12) United States Patent
Valkaitis

(10) Patent No.: US 12,184,763 B2
(45) Date of Patent: *Dec. 31, 2024

(54) SHARING ACCESS TO DATA EXTERNALLY

(71) Applicant: UAB 360 IT, Vilnius (LT)

(72) Inventor: Mindaugas Valkaitis, Vilnius (LT)

(73) Assignee: UAB 360 IT, Vilnius (LT)

(*) Notice: Subject to any disclaimer, the term of this patent is extended or adjusted under 35 U.S.C. 154(b) by 0 days.

This patent is subject to a terminal disclaimer.

(21) Appl. No.: 18/380,856

(22) Filed: Oct. 17, 2023

(65) Prior Publication Data
US 2024/0048365 A1 Feb. 8, 2024

Related U.S. Application Data

(63) Continuation of application No. 17/520,608, filed on Nov. 5, 2021, now Pat. No. 11,888,971, which is a continuation of application No. 17/519,552, filed on Nov. 4, 2021, now Pat. No. 11,528,131.

(51) Int. Cl.
*H04L 9/08* (2006.01)
*G06F 21/60* (2013.01)
*H04L 9/32* (2006.01)
*H04L 9/40* (2022.01)

(52) U.S. Cl.
CPC .......... *H04L 9/0825* (2013.01); *G06F 21/602* (2013.01); *H04L 9/0819* (2013.01); *H04L 9/3242* (2013.01); *H04L 9/3297* (2013.01); *H04L 63/0435* (2013.01)

(58) Field of Classification Search
CPC ... H04L 9/0825; H04L 9/0819; H04L 9/3242; H04L 9/3297; H04L 63/0435; G06F 21/602
See application file for complete search history.

(56) References Cited

U.S. PATENT DOCUMENTS

| | | |
|---|---|---|
| 6,826,594 B1 | 11/2004 | Pettersen |
| 8,560,843 B1 | 10/2013 | Moscaritolo et al. |
| 10,491,703 B1 | 11/2019 | Lepeska et al. |
| 10,795,693 B2 | 10/2020 | Chen et al. |
| 11,216,581 B1 | 1/2022 | Arikapudi et al. |
| 2002/0133697 A1 | 9/2002 | Royer et al. |
| 2008/0215755 A1 | 9/2008 | Farber et al. |
| 2010/0198678 A1 | 8/2010 | Burst et al. |
| 2010/0332588 A1* | 12/2010 | Schwimer .......... H04L 67/1001 709/203 |
| 2011/0231840 A1 | 9/2011 | Burch et al. |

(Continued)

*Primary Examiner* — Techane Gergiso
(74) *Attorney, Agent, or Firm* — The Pattani Law Group

(57) ABSTRACT

A method including receiving, by a receiving device from a transmitting device, a sharing link to be utilized by the receiving device to obtain access to encrypted content that is stored in a storage device, the sharing link including static portion information to enable the receiving device to reach the storage device and dynamic portion information including an identifier that uniquely identifies the receiving device; transmitting, by the receiving device to the storage device based at least in part on utilizing the static portion information, a request to access the encrypted content; and receiving, by the receiving device from the storage device, access to the encrypted content based at least in part on transmitting the request is disclosed. Various other aspects are contemplated.

20 Claims, 7 Drawing Sheets

(56) References Cited

U.S. PATENT DOCUMENTS

| | | | |
|---|---|---|---|
| 2012/0163598 A1* | 6/2012 | Wang | H04L 63/061 380/259 |
| 2013/0163758 A1 | 6/2013 | Swaminathan et al. | |
| 2014/0215210 A1 | 7/2014 | Wang et al. | |
| 2014/0223016 A1 | 8/2014 | Varney et al. | |
| 2015/0095343 A1 | 4/2015 | Divilly et al. | |
| 2015/0127628 A1 | 5/2015 | Rathod | |
| 2015/0264020 A1 | 9/2015 | Ackerly et al. | |
| 2015/0381588 A1 | 12/2015 | Huang et al. | |
| 2016/0021207 A1 | 1/2016 | Dingwall et al. | |
| 2017/0249394 A1* | 8/2017 | Loeb | H04L 63/0407 |
| 2018/0034901 A1* | 2/2018 | Shnitko | H04L 61/30 |
| 2018/0041567 A1 | 2/2018 | Kidambi et al. | |
| 2018/0069840 A1* | 3/2018 | Chilakapati | H04L 63/123 |
| 2018/0365034 A1 | 12/2018 | Becotte, IV et al. | |
| 2019/0036878 A1 | 1/2019 | Morrison | |
| 2020/0034489 A1 | 1/2020 | Liu et al. | |
| 2020/0036685 A1 | 1/2020 | Liu et al. | |
| 2020/0334050 A1 | 10/2020 | Becotte, IV et al. | |
| 2020/0380080 A1 | 12/2020 | Glunz | |
| 2021/0097168 A1 | 4/2021 | Patel et al. | |
| 2021/0297390 A1 | 9/2021 | Ravi | |

\* cited by examiner

SHARING ACCESS TO DATA EXTERNALLY

CROSS REFERENCE

This application is a continuation of U.S. Non-Provisional patent application Ser. No. 17/520,608, filed on Nov. 5, 2021, and titled "Sharing Access To Data Externally," which is a continuation of U.S. Non-Provisional patent application Ser. No. 17/519,552, filed on Nov. 4, 2021, and titled "Sharing Access To Data Externally," the entire contents of which applications are incorporated herein by reference.

FIELD OF DISCLOSURE

Aspects of the present disclosure generally relate to use of computer hardware and/or software to manage data, and in particular to sharing access to data externally.

BACKGROUND

Various methods of cryptography (e.g., encrypting and decrypting data) are known. Encryption may be associated with changing the data from being in a transparently readable format to being in an encoded, unreadable format with the help of an encryption algorithm. Decryption may be associated with changing the data from being in the encoded, unreadable format to being in the transparently readable format with the help of a decryption algorithm. Encoded/encrypted data may be decoded/decrypted with a given decryption key. In an example, symmetric cryptography may utilize encryption and decryption algorithms that rely on a single key for encryption and decryption of data. Symmetric cryptography is considered to be relatively speedy. One example of an encryption and decryption algorithm utilized by symmetric encryption may be an AES encryption cipher. On the other hand, asymmetric cryptography may utilize encryption and decryption algorithms that rely on two separate but mathematically-related keys for encryption and decryption of data. In an example, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

SUMMARY

In one aspect, the present disclosure contemplates a method comprising including transmitting, by a device, encrypted content to an endpoint capable of managing access to the encrypted content; determining, by the device, a sharing link including a static portion and a dynamic portion, the static portion being associated with the endpoint and the dynamic portion including a unique identifier associated with the encrypted content; and transmitting, by the device, the dynamic portion of the sharing link to the endpoint to enable the endpoint to provide another device with access to the encrypted content.

In another aspect, the present disclosure contemplates a device comprising a memory and a processor communicatively coupled to the memory, the processor being configured to: transmit encrypted content to an endpoint capable of managing access to the encrypted content; determine a sharing link including a static portion and a dynamic portion, the static portion being associated with the endpoint and the dynamic portion including a unique identifier associated with the encrypted content; and transmit the dynamic portion of the sharing link to the endpoint to enable the endpoint to provide another device with access to the encrypted content.

In another aspect, the present disclosure contemplates a non-transitory computer readable medium storing instructions, which when executed by a processor cause the processor to: transmit encrypted content to an endpoint capable of managing access to the encrypted content; determine a sharing link including a static portion and a dynamic portion, the static portion being associated with the endpoint and the dynamic portion including a unique identifier associated with the encrypted content; and transmit the dynamic portion of the sharing link to the endpoint to enable the endpoint to provide another device with access to the encrypted content.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
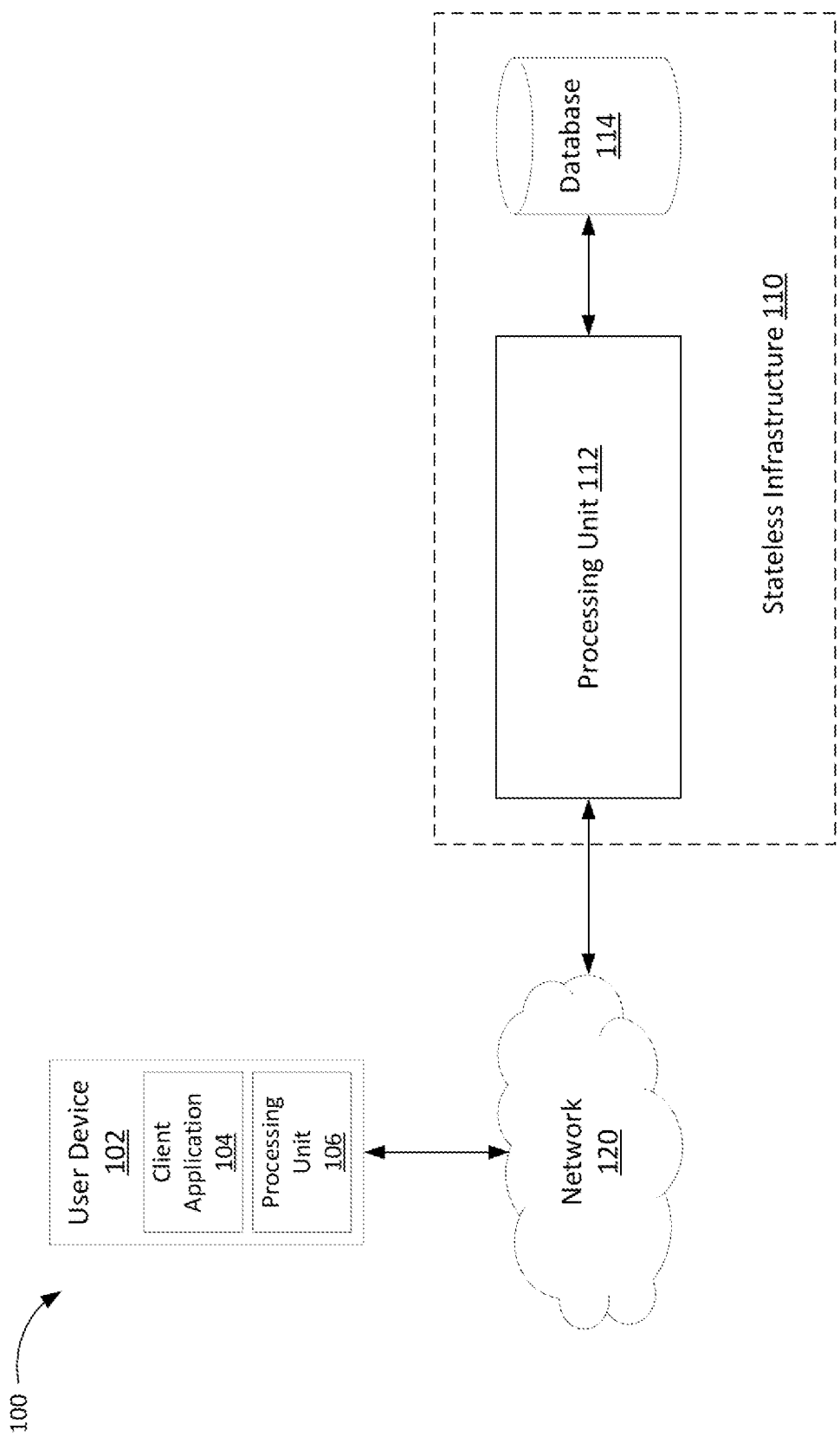

FIG. 1 is an illustration of an example system associated with sharing access to data externally, according to various aspects of the present disclosure.

Figure 2:
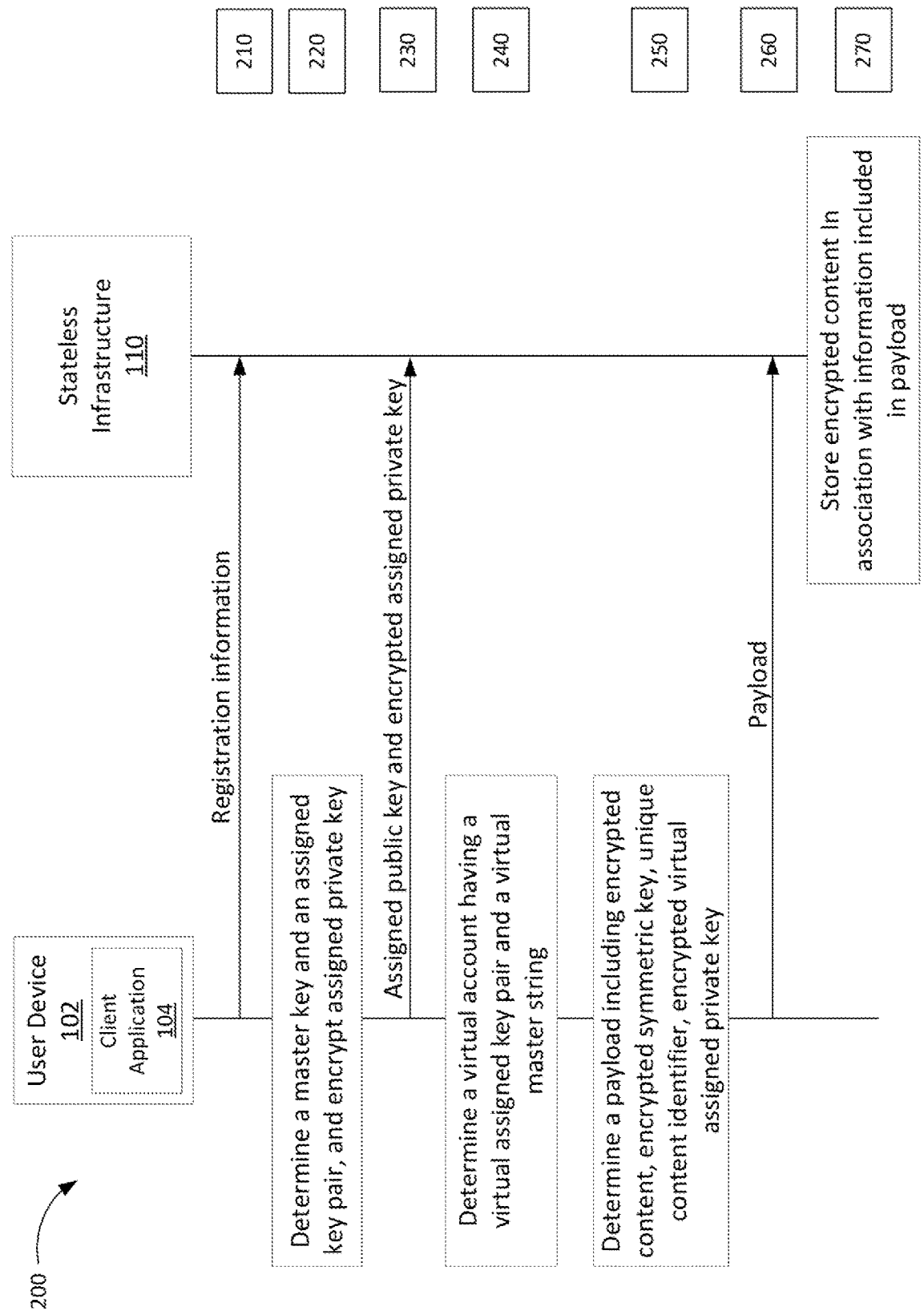

FIG. 2 is an illustration of an example flow associated with sharing access to data externally, according to various aspects of the present disclosure.

Figure 3:
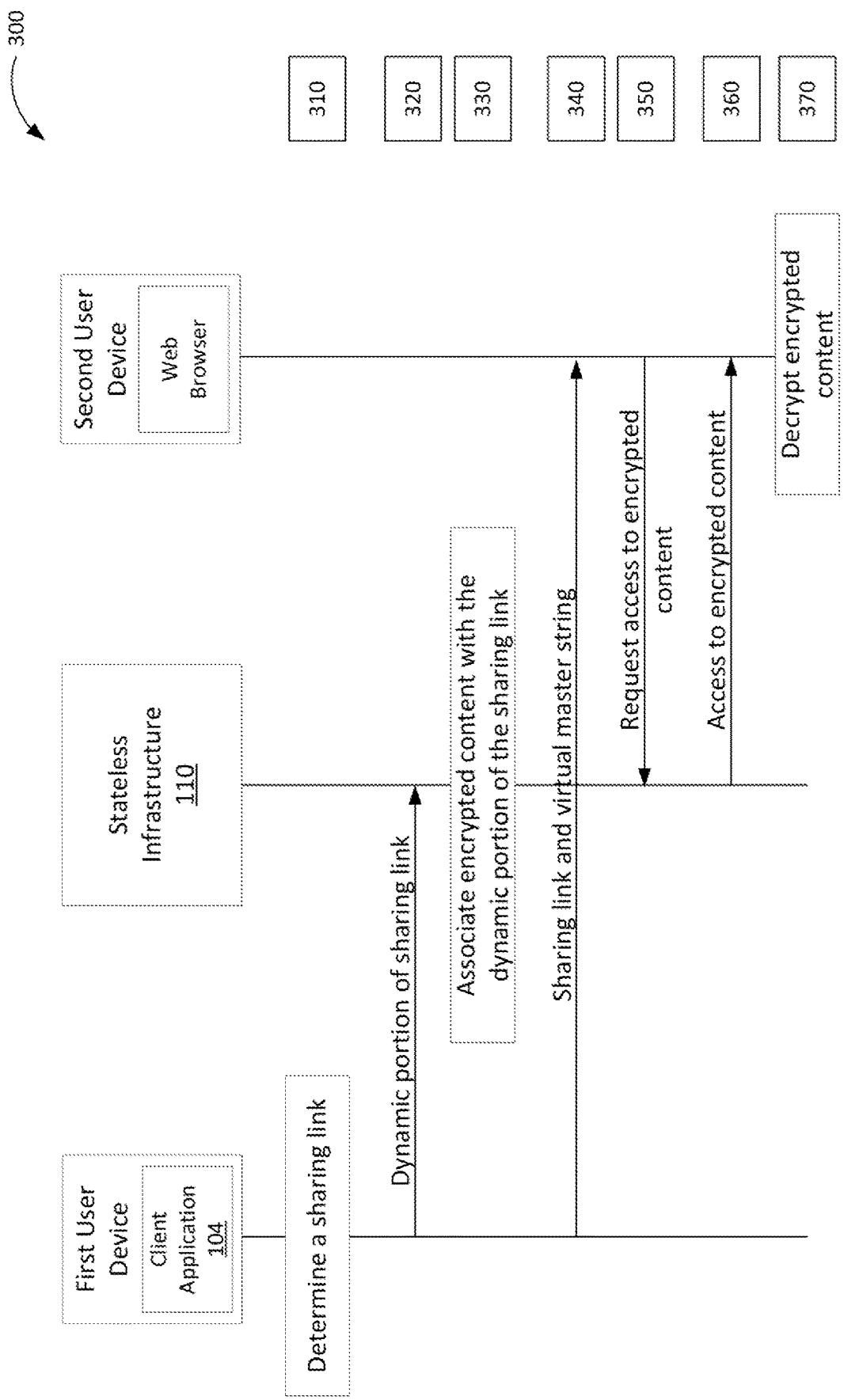

FIG. 3 is an illustration of an example flow associated with sharing access to data externally, according to various aspects of the present disclosure.

Figure 4:
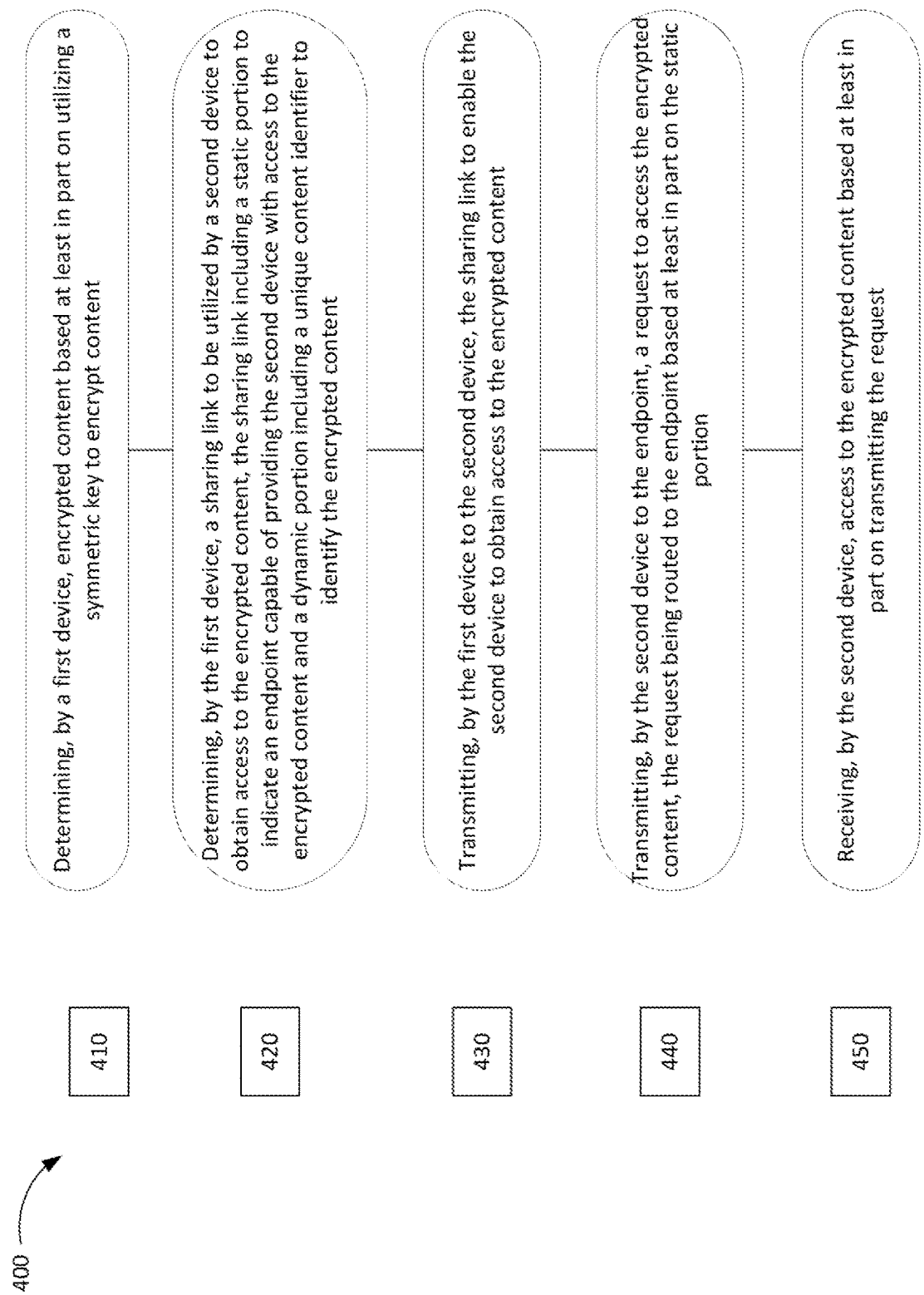

FIG. 4 is an illustration of an example process associated with sharing access to data externally, according to various aspects of the present disclosure.

Figure 5:
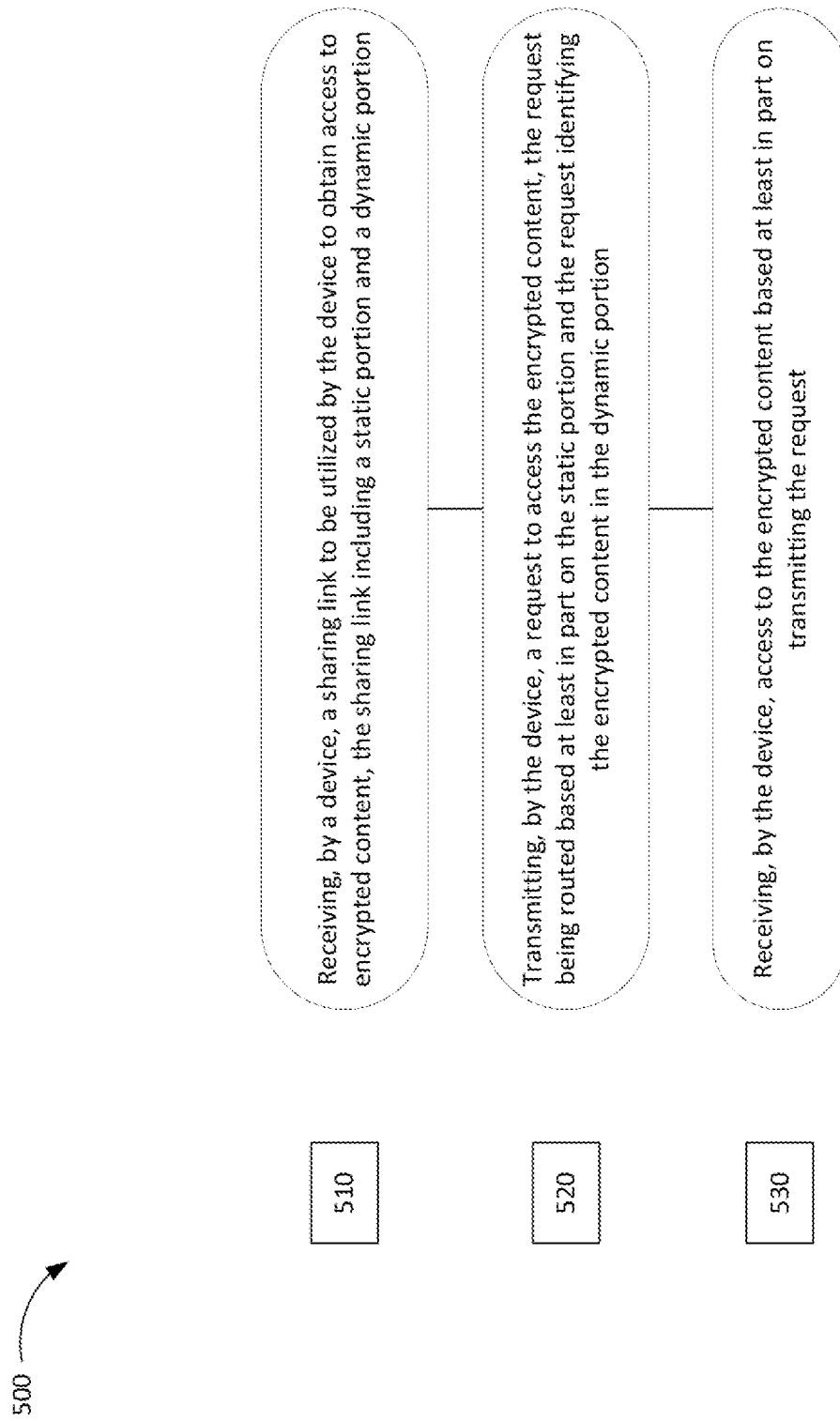

FIG. 5 is an illustration of an example process associated with sharing access to data externally, according to various aspects of the present disclosure.

Figure 6:
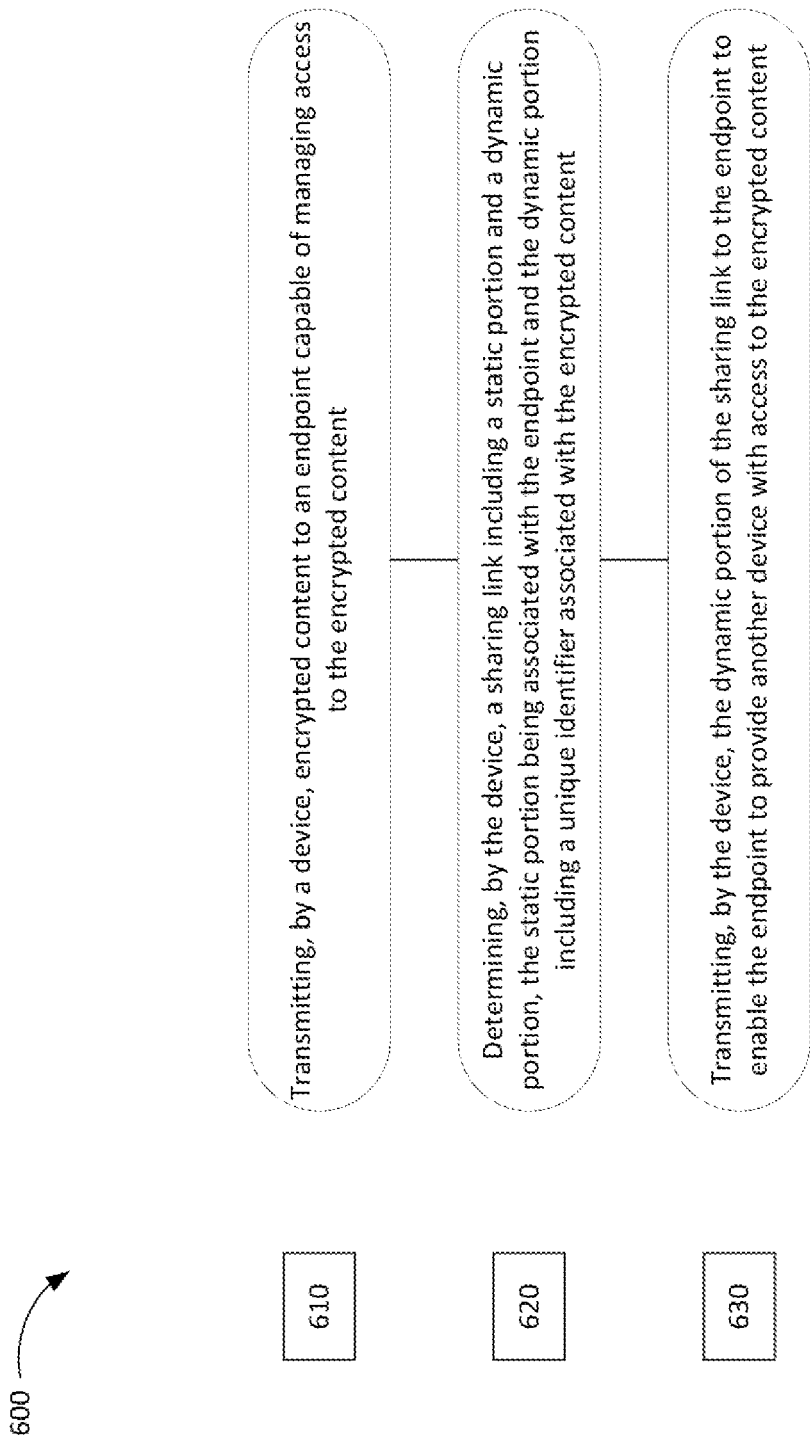

FIG. 6 is an illustration of an example process associated with sharing access to data externally, according to various aspects of the present disclosure.

Figure 7:
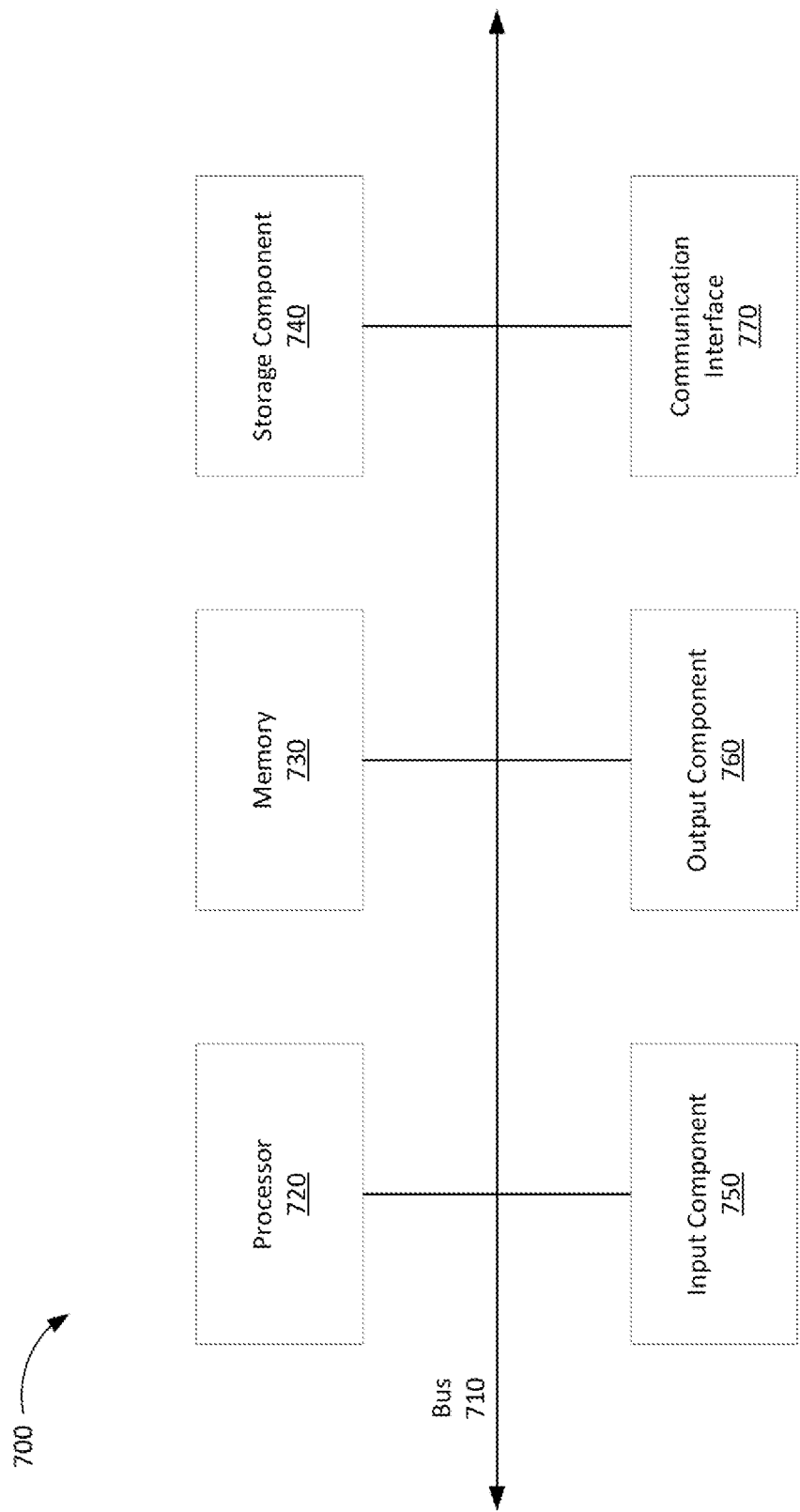

FIG. 7 is an illustration of example devices associated with sharing access to data externally, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with sharing access to data externally, according to various aspects of the present disclosure. The system 100 includes one or more user devices 102 communicating a stateless infrastructure 110 including a processing unit 112 and a database (e.g., memory) 114. In an example, a user device 102 may include a processing unit 106 and may utilize an installed client application 104 to communicate with an application programming interface (API) (not shown) included in the stateless infrastructure 110. In some aspects, the user device 102 and the stateless infrastructure 110 may communicate with one another over a network 120. The network 120 may be wired or wireless network. In some aspects, the network 120 may include one or more of, for example, a phone line, a local-area network (LAN), a wide-area network (WAN), a metropolitan-area network (MAN), a home-area network (HAN), Internet, Intranet, Extranet, and Internetwork. In some aspects, the network 120 may include a digital telecommunication network that permits several nodes to share and access resources.

The user device 102 may be a physical computing device capable of hosting a client application and of connecting to the network 120. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The user device 102 may include and/or may be associated with a communication interface to communicate (e.g., receive and/or transmit) data.

In some aspects, the stateless infrastructure 110 may provide the user device 102 with a client application 104 to be installed on the user device 102. The client application 104 may enable a processor (e.g., processing unit 106, processor 720) associated with the user device 102 to encrypt and decrypt the data. In some aspects, the client application 104 and/or the stateless infrastructure 110 may utilize one or more encryption and decryption algorithms to encrypt and decrypt the data. The encryption algorithms and decryption algorithms may employ standards such as, for example, data encryption standards (DES), advanced encryption standards (AES), Rivest-Shamir-Adleman (RSA) encryption standard, Open PGP standards, file encryption overview, disk encryption overview, email encryption overview, etc. Some examples of encryption algorithms include a triple data encryption standard (DES) algorithm, Rivest-Shamir-Adleman (RSA) encryption algorithm, advanced encryption standards (AES) algorithms, Twofish encryption algorithms, Blowfish encryption algorithms, IDEA encryption algorithms, MD5 encryption algorithms, HMAC encryption algorithms, etc.

In some aspects, data may include any information such as private information including, for example, bank account numbers, credit card numbers, various passwords, etc. In some aspects, the data may include electronic information included in files such as, for example, photographs, documents, compact discs (CDs), digital video disks (DVDs), etc. including written, printed, and/or electronic matter that provides information and/or evidence.

The stateless infrastructure 110 may include the processing unit 112 and the database 114. The processing unit 112 may include a logical component configured to perform complex operations to evaluate various factors associated with encrypting and decrypting the data. The database 114 may store various pieces of information associated with encrypting and decrypting the data, including encrypted content and/or encrypted key information. In some aspects, the stateless infrastructure 110 may include the API (not shown) to communicate with the client application 104. The stateless infrastructure 110 may include or be associated with a communication interface to communicate (e.g., transmit and/or receive) data.

As indicated above, FIG. 1 is provided as an example. Other examples may differ from what is described with regard to FIG. 1.

A user device may request data storage services from a data storage service provider (DSSP). Such data storage services may include cloud storage services that enable the user device to utilize, for example, the Internet to store data on remote servers and/or storage devices managed by the DSSP. The data storage services may also be referred to as cloud backup services, online data storage services, online drive storages, file hosting services, file storage services, or the like. The DSSP may attempt to protect the stored data by requiring the user device to provide credentials (e.g., username, password, one-time passwords, one-time tokens, or the like) to gain authorized access to the stored data. The data storage services may be available via use of a web interface and/or an application interface.

In some instances, the DSSP may fail to protect the stored data. In an example, a third party may gain unauthorized access to the stored data by, for example, hacking into the servers and/or storage devices managed by the DSSP. In another example, internal devices associated with the DSSP that have access to the servers and/or storage devices managed by the DSSP may gain unauthorized access to the stored data. As a result, an integrity associated with the stored data may be compromised. To regain access to the stored data and/or to protect the stored data, the user device and/or the DSSP may expend resources (e.g., management resources, memory resources, computational/processing resources, power consumption resources, system bandwidth, network resources, etc.) that may otherwise be used for more suitable tasks associated with the data storage services.

Various aspects of systems and techniques discussed in the present disclosure enable encrypting and decrypting data. In some aspects, a DSSP may provide a stateless system including a stateless infrastructure and/or a client application installed on a user device. In some aspects, the stateless infrastructure may provide the user device with the client application. In some aspects, the client application may enable the user device to encrypt and decrypt the data that the user device may wish to protect. In an example, the client application may enable the user device to encrypt data, to store the encrypted data, and to decrypt the encrypted data. In some aspects, the user device may encrypt the data, store the encrypted data, and decrypt the encrypted data without the stateless infrastructure having access to unencrypted data. As a result, even if a third party gains unauthorized access to the client application and/or the stateless infrastructure, the unauthorized access may lead to encrypted data, which the third party may not be able to decrypt. The client application and/or the stateless infrastructure may employ a particular arrangement of keys to encrypt and decrypt the data. Such particular arrangement of keys may be critical because it enables the client application and/or the stateless infrastructure to provide data storage services (e.g., protect stored data) without having access to unencrypted data. In this way, the client application and/or the stateless infrastructure may mitigate instances of the data becoming compromised, thereby enabling efficient utilization of resources (e.g., management resources, memory resources, computational/processing resources, power consumption resources, system bandwidth, network resources, etc.) associated with the user device and/or the stateless infrastructure for more suitable tasks related to the data storage services.

Additional aspects of systems and techniques discussed herein enable the stateless system to manage access to encrypted data. For instance, the stateless system may enable authorized access to the encrypted data and may prevent unauthorized access to the encrypted data. In some aspects, as discussed below in further detail, the stateless system may enable the user device to access the encrypted data via the client application and/or a web browser installed on the user device. To enable the authorized access, the stateless system may provide one or more relationships using a particular key arrangement. Such particular key arrangement may be critical because it enables authorized access to the encrypted data and prevents unauthorized access to the encrypted data without having access to unencrypted data.

Additional aspects of systems and techniques discussed herein enable the user device to share access to the encrypted data via the stateless system. For instance, the stateless system may enable encrypted content associated with a registered account of the user device to be shared with an external user device that does not have a registered account with the stateless system. The stateless system may enable the external user device to access the encrypted data without having access to unencrypted data (e.g., content, key information, etc.). In some aspects, as discussed below in further detail, a client application installed on a user device associated with the registered account may provide one or more relationships using a particular key arrangement to enable the external user device to gain authorized access to the encrypted content. Such particular key arrangement may be critical because it enables the authorized access without having access to unencrypted data.

In some aspects, the client application and/or the stateless infrastructure may transmit encrypted content to an endpoint capable of managing access to the encrypted content; determine a sharing link including a static portion and a dynamic portion, the static portion being associated with the endpoint and the dynamic portion including a unique identifier associated with the encrypted content; and transmit the dynamic portion of the sharing link to the endpoint to enable the endpoint to provide another device with access to the encrypted content.

FIG. 2 is an illustration of an example flow 200 associated with sharing access to data externally, according to various aspects of the present disclosure. The example flow 200 may include a user device 102 in communication with a stateless infrastructure 110. In some aspects, the user device 102 may install a client application 104 associated with the stateless infrastructure 110 and may use the client application 104 to communicate with an API and a processor (e.g., processing unit 112, processor 720) associated with the stateless infrastructure 110. In some aspects, the user device 102 and the stateless infrastructure may communicate over a network (e.g., network 120).

As shown by reference numeral 210, the user device 102 may register an account with the stateless infrastructure 110. In some aspects, during the registration, the user device 102 may provide registration information such as, for example, identity of an owner of the user device 102, a phone number associated with the user device 102, an email address associated with the user device 102, or the like. In some aspects, the user device 102 may set up an access system including, for example, username, password, or the like to subsequently gain access to the registered account.

In some aspects, the stateless infrastructure 110 may provide the client application 104 to be installed on the user device 102. The client application 104 may enable the user device 102 to receive information to be processed by the client application 104 and/or by the stateless infrastructure 110. The client application 104 may include a graphical interface to receive the information via a local input interface (e.g., touch screen, keyboard, mouse, pointer, etc.) associated with the user device 102. The information may be received via text input or via a selection from among a plurality of options (e.g., pull down menu, etc.). In some aspects, the client application 104 may activate and/or enable, at a time associated with the registration (e.g., after the registration), the graphical interface for receiving the information. For instance, the client application 104 may cause a screen (e.g., local screen) associated with the user device 102 to display, for example, a pop-up message to request entry of the information. Further, the client application 104 may enable transmission of at least a portion of the information to the stateless infrastructure 110.

As shown by reference numeral 220, the client application 104 may determine information based at least in part on the registration of the account with the stateless infrastructure 110. In an example, the client application 104 may determine an asymmetric assigned key pair for the registered account associated with user device 102. In some aspects, the assigned key pair may be unique to the registered account and may include an assigned public key and an assigned private key. In this way, the assigned public key and the assigned private key may be account-specific. In other words, the determined assigned key pair may be unique to and/or may it be associated with the registered account. The assigned public key and the assigned private key may be associated with each other via, for example, a mathematical function. As a result, data encrypted using the assigned public key may be decrypted by utilizing the assigned private key.

Further, the client application 104 may receive a master string of alphanumeric characters from the user device 102. In some aspects, the master string may be unique and be associated with the registered account associated with the user device 102. Based at least in part on receiving the master string, the client application 104 may determine a master key. In some aspects, the client application 104 may utilize a password derivation function and/or a key derivation function to determine the master key based at least in part on the master string. The password derivation function and/or the key derivation function may perform password hashing to determine the master key. The client application 104 may utilize the master key to encrypt the assigned private key associated with the registered account.

As shown by reference numeral 230, the client application 104 may transmit, and the stateless infrastructure 110 may receive, at least a portion of the information determined by the client application 104. For instance, the client application 104 may transmit, for example, the assigned public key and the encrypted assigned private key to the stateless infrastructure 110. The stateless infrastructure 110 may store the received information in association with the registered account associated with the user device 102. In some aspects, when another device associated with the registered account (e.g., another device owned by and/or available to the owner of the user device 102) wishes to decrypt the encrypted content, the stateless infrastructure 110 may provide such information to the other device. In some aspects, the first user device may utilize an associated communication interface (e.g., communication interface 770) to transmit at least the portion of the information determined by the client application 104.

In some aspects, the user device 102 may authorize an external device (e.g., that does not have a registered account with the stateless infrastructure 110) to gain authorized access to and decrypt the encrypted content. In this case, as shown by reference numeral 240, the client application 104 may determine a virtual registered account. Further, the client application 104 may determine a virtual assigned key pair associated with the virtual registered account. In some aspects, the virtual assigned key pair may be unique to the virtual registered account and may include a virtual assigned public key and a virtual assigned private key. In this way, the virtual assigned public key and the virtual assigned private key may be account-specific. In other words, the determined virtual assigned key pair may be unique to and/or may it be associated with the virtual registered account. The virtual assigned public key and the virtual assigned private key may be associated with each other via, for example, a mathematical function. As a result, data encrypted using the virtual assigned public key may be decrypted by utilizing the virtual assigned private key.

Further, the client application 104 may receive a virtual master string of alphanumeric characters from the user device 102. In some aspects, the virtual master string may be unique and be associated with the virtual registered account. Based at least in part on receiving the virtual master string, the client application 104 may determine a virtual master key. In some aspects, the client application 104 may utilize a password derivation function and/or a key derivation function to determine the virtual master key based at least in part on the virtual master string. The password derivation function and/or the key derivation function may perform password hashing to determine the virtual master key. The client application 104 may utilize the virtual master key to encrypt the virtual assigned private key associated with the virtual registered account.

Further, as shown by reference numeral 250, when the user device 102 wishes to encrypt data, the client application 104 may determine a symmetric key. In some aspects, the client application 104 may determine respective symmetric keys for each piece of data (e.g., content) that the user device 102 may wish to encrypt. In this way, the symmetric key may be content-specific. Examples of content may include any information including, for example, alphanumeric data such as passwords, credit card numbers, bank account numbers, etc. and/or information that is written, printed, and/or electronically included in documents and/or files such as photographs, or processing documents, CDs, DVDs, etc.

For given content, the client application 104 may utilize a random bit generator to determine the symmetric key. In this case, the symmetric key may be a random key including a sequence of unpredictable and unbiased information. The client application 104 may utilize the symmetric key to encrypt the content. Further, the client application 104 may determine a unique identifier to identify the encrypted content. The client application 104 may encrypt the symmetric key using the virtual assigned public key associated with the virtual account. The client application 104 may encrypt the virtual assigned private key using the virtual master key. In some aspects, the client application 104 may determine a payload including the encrypted content, the encrypted symmetric key, the unique content identifier, and the encrypted virtual assigned private key.

As shown by reference numeral 260, the client application 104 may transmit, and the stateless infrastructure 110 may receive, at least a portion of the information determined by the client application 104. For instance, the client application 104 may transmit the payload including one or more of the encrypted content, the encrypted symmetric key, the unique content identifier, or the encrypted virtual assigned private key to the stateless infrastructure 110. In some aspects, when a requesting device such as, for example, another device associated with the registered account (e.g., another device owned by and/or available to the owner of the user device 102) or the external wishes to decrypt the encrypted content, the stateless infrastructure 110 may provide such information to the requesting device. In some aspects, the first user device may utilize an associated communication interface (e.g., communication interface 770) to transmit the payload.

As shown by reference numeral 270, the stateless infrastructure 110 may enable the user device 102 to store the encrypted content in association with the information included in the payload. In some aspects, the stateless system may enable the user device 102 to store the encrypted content. For instance, the user device 102 may store the encrypted content locally and/or remotely. In an example, the user device 102 may store the encrypted content in a local memory and/or a remote memory associated with the user device 102 and the stateless infrastructure 110 may manage access to the stored encrypted content. In another example, the user device 102 may store the encrypted content in a data storage associated with data storage services provided by the stateless system and the stateless infrastructure 110 may manage access to the stored encrypted content. In yet another example, the user device 102 may store the encrypted content in a hand-held memory (e.g., a USB thumb drive, flash drive, etc.) and the stateless infrastructure 110 may manage access to the stored encrypted content.

In some aspects, one or more functionalities performed by the client application 104 may be included in and/or may be performed by the stateless infrastructure 110, and vice versa.

By utilizing the above critical arrangement, the stateless infrastructure 110 may enable the client application 104 and/or the stateless infrastructure 110 to provide data storage services (e.g., protect data) without having access to unencrypted content. For instance, the stateless infrastructure 110 may not have access to and/or may not store information such as the master string, the master key, assigned key pair, content, etc. in unencrypted form. Additionally, the client application 104 and/or the stateless system 110 may mitigate instances of the data becoming compromised, thereby enabling efficient utilization of resources (e.g., management resources, memory resources, computational/processing resources, power consumption resources, system bandwidth, network resources, etc.) associated with the user device 102 and/or the stateless system 110 for more suitable tasks related to the data storage services.

As indicated above, FIG. 2 is provided as an example. Other examples may differ from what is described with regard to FIG. 2.

FIG. 3 is an illustration of an example flow 300 associated with sharing access to data externally, according to various aspects of the present disclosure. The example flow 300 may include a first user device (e.g., user device 102 discussed above with respect to FIG. 2), stateless infrastructure 110, and a second user device (e.g., another user device) in communication with each other. In some aspects, the first user device may be associated with a registered account associated with the stateless infrastructure 110 and the second user device may be an external user device that is not associated with a registered account with the stateless infrastructure 110. In some aspects, the first user device may install a first client application (e.g., client application 104) and the second user device may install a web browser. In some aspects, the first client application may be associated with the stateless infrastructure 110 and the web browser may be any publicly or privately available web browser. The first user device and the second user device may use the respective communication interfaces (e.g., communication interface 770) to communicate with an API and a processor (e.g., processing unit 112, processor 720) associated with the stateless infrastructure 110. In some aspects, the first user device, the stateless infrastructure, and the second user device may communicate with each other over a network (e.g., network 120).

In some aspects, the client application 104 device may encrypt content and may have authorized access to encrypted content, as discussed above with respect to FIG. 2. The first user device may wish to share the encrypted content with the second user device (e.g., external user device). In some aspects, the first user device may share the encrypted content with the second user device by granting the second user device authorized access to the encrypted content.

To grant the second user device the authorized access, as shown by reference numeral 310, the client application 104 may determine a sharing link. In some aspects, the sharing link may be a uniform resource locator (URL) associated with a uniform resource identifier (URI) and may indicate, for example, a location, metadata, information, etc. associated with the encrypted content to enable access to the encrypted content.

In some aspects, the sharing link may include a static portion and a dynamic portion. In an example, the sharing link may be in the form of (static portion)(dynamic portion). The static portion may remain constant for sharing links determined with respect to sharing access to the encrypted content. In some aspects, the static portion may be associated with an endpoint (e.g., the stateless infrastructure 110) that will enable the second user device to gain access to the encrypted content. For instance, while utilizing the sharing link to access the encrypted content, the second user device may be routed to an Internet protocol (IP) address associated with the stateless infrastructure 110 based at least in part on the information included in the static portion. In an example, the static portion may include https://endpoint.com/webview/ or www.endpoing.com/webview/.

The dynamic portion may be universal or may be recipient-specific (e.g., unique to the second user device). When the dynamic portion is universal, the client application 104 may determine the universal dynamic portion based at least in part on utilizing a UNIX time system (e.g., Epoch time, Posix time, etc.) to describe a point in time. In some aspects, the described point in time may be associated with a point in time when the sharing link is determined. In some aspects, the described point in time may be associated with a point in time before which the sharing link is to be utilized to access the encrypted content. To determine the universal dynamic portion, the client application 104 may combine a unique content identifier that identifies the encrypted content and a timestamp associated with the described point in time. Further, the client application 104 may utilize a hash function to hash the combination of the unique content identifier and the timestamp. The hash function may utilize hash algorithms such as, for example, SHA-256, SHA-1, SHA-2, MD5, NTLM, LANMAN, or the like. Further, the client application 104 may encode the hashed combination utilizing and encoding scheme (e.g., Base64 encoding scheme).

When the dynamic portion is recipient-specific, the client application 104 may determine the recipient-specific dynamic portion based at least in part on determining a unique recipient identifier that serves to identify the second user device. To determine the recipient-specific dynamic portion, the client application 104 may combine the unique content identifier that identifies the encrypted content and the unique recipient identifier. Further, the client application 104 may utilize a hash function to hash the combination of the unique content identifier and the unique recipient identifier. The hash function may utilize hash algorithms such as, for example, SHA-256, SHA-1, SHA-2, MD5, NTLM, LANMAN, or the like. Further, the client application 104 may encode the hashed combination utilizing and encoding scheme (e.g., Base64 encoding scheme).

In an example, the sharing link may be in the form of, for example, https://endpoint.com/webview/74obUbN2et6fYKqd70v
NHRVXoUKDaWICgONh4wyrUqg= where https://endpoint.com/
webview/may be the static portion and
74obUbN2et6fYKqd70vNHRV
XoUKDaWICgONh4wyrUgg=may be the dynamic portion (e.g., universal dynamic portion or recipient-specific dynamic portion).

As shown by reference numeral 320, the first user device may transmit, and the stateless infrastructure 110 may receive, the dynamic portion of the sharing link. In some aspects, the first user device may utilize an associated communication interface (e.g., communication interface 770) to transmit the dynamic portion of the sharing link.

Based at least in part on receiving the dynamic portion of the sharing link, as shown by reference numeral 330, the stateless infrastructure 110 may associate the dynamic portion of the sharing link with the stored encrypted content and other information included in a received payload (e.g., FIG. 2, blocks 250-270). This may allow the stateless infrastructure to manage access to the encrypted content, as discussed below. In some aspects, the stateless infrastructure 110 may store the association of the dynamic portion of the sharing link with the stored encrypted content and the other information included in the payload in, for example, database 114. In some aspects, the encrypted content and the other information included in the payload may also be stored in the database 114 or in another location, as discussed elsewhere herein. As discussed below in further detail, a user device (e.g., another user device associated with the registered account, external user device, etc.) may utilize the dynamic portion of the sharing link to gain authorized access to the encrypted content.

As shown by reference numeral 340, the first user device may transmit, and the second user device may receive, the sharing link to be utilized by the second user device to gain authorized access to the encrypted content. The first user device may also transmit the unique content identifier associated with the encrypted content to enable the second user device to access the encrypted content. Further, the first user device may transmit, and the second user device may receive, the virtual master string determined by the first user device (e.g., FIG. 2, block 240). In some aspects, as discussed below in further detail, the second user device may utilize the virtual master string to decrypt the encrypted content. In some aspects, the first user device may transmit the sharing link and/or the virtual master string to the second user device independently from (e.g., without involvement of) the stateless infrastructure 110. As a result, the stateless infrastructure 110 may have no knowledge of the master string, unencrypted content, and/or unencrypted keys.

When the second user device wishes to access the encrypted content, as shown by reference numeral 350, the second user device may request the stateless infrastructure 110 to grant access to the encrypted content. In some aspects, the second user device may utilize a web browser installed on the second user device to request the access. For instance, the second user device may utilize the web browser to navigate to the stateless infrastructure 110 based at least in part on using the static portion of the sharing link. In some aspects, the request may include a request for the encrypted content and the other information received by the stateless infrastructure 110 in the payload (e.g., FIG. 2, blocks 250-270). In some aspects, the request may identify the encrypted content based at least in part on including the unique content identifier associated with the encrypted content. In this way, the second user device that does not have a registered account with the stateless infrastructure 110 may be enabled to access the encrypted content via the Internet.

Based at least in part on receiving the request to access the encrypted content, as shown by reference numeral 360, the stateless infrastructure 110 may provide the second user device with access to the encrypted content. In some aspects, the stateless infrastructure 110 may determine that the second user device is requesting access to the encrypted content based at least in part on the unique content identifier included in the request. In some aspects, the stateless infrastructure 110 may determine that the second user device is requesting access to the encrypted content based at least in part on comparing the dynamic portion of the sharing link provided by the second user device with the dynamic portion of the sharing link associated by the stateless infrastructure 110 with the encrypted content in block 330. The stateless infrastructure 110 may provide access to the second user device by transmitting the encrypted content and/or the other information to the second user device.

Based at least in part on receiving the encrypted content and/or the other information, as shown by reference numeral 370, the second user device may decrypt the encrypted content. In some aspects, the second user device may install a second client application provided by the stateless infrastructure 110 to decrypt the encrypted content. The second client application may receive the virtual master string from the second user device. The second client application may determine the virtual master key based at least in part on the virtual master string. Further, the second client application may utilize the virtual master key to decrypt the virtual assigned private key. The second client application may utilize the virtual assigned private key to decrypt the randomly generated symmetric key that is encrypted utilizing the virtual assigned public key associated with the encrypted content. In some aspects, the second client application may utilize an association between the virtual assigned private key and the virtual assigned public key to decrypt the randomly generated symmetric key. The second client application may utilize the randomly generated symmetric key to decrypt the encrypted content. In this way, the second user device may gain authorized access to the content.

In some aspects, the first user device may enable the stateless infrastructure 110 to verify, prior to providing access to the encrypted content, whether access to the encrypted content is to be provided to the second user device. The first user device may utilize a hash function to hash at least a portion of the virtual master string. The hash function may utilize hash algorithms such as, for example, SHA-256, SHA-1, SHA-2, MD5, NTLM, LANMAN, or the like. The first user device may transmit the hash of the portion of the virtual master string in the payload (e.g., FIG. 2, block 260). The stateless infrastructure 110 may store the hash of the portion of the virtual master string in, for example, database 114. When the second user device requests access to the encrypted content, the stateless infrastructure 110 may request the second user device to provide at least the portion of the virtual master string. The stateless infrastructure 110 may decline the request to access the encrypted content when the second user device fails to provide the portion of the virtual master string. Alternatively, when the second user device provides the portion of the virtual master string, the stateless infrastructure 110 may calculate a hash of the portion of the virtual master string and compare the calculated hash with the hash provided by the first user device. Based at least in part on a result of the comparison, the stateless infrastructure 110 may determine whether to provide the second user device with access to the encrypted content. In an example, when the calculated hash matches the hash provided by the first user device, the stateless infrastructure 110 may provide the second user device with access to the encrypted content. Alternatively, when the calculated hash fails to match the hash provided by the first user device, the stateless infrastructure 110 may decline the request from the second user device to access the encrypted content. In this way, the stateless system may enable a device (e.g., another device associated with the registered account, an external device, etc.) to obtain access to the encrypted content when the device has access to the virtual master string, and may prevent a device from obtaining access to the encrypted content when the device does not have access to the virtual master string.

By utilizing the systems and techniques discussed herein, the stateless system may enable the first user device, associated with the first registered account, to share authorized access to encrypted data with an external user device. The particular key arrangement utilized by the stateless system may be critical because it enables the authorized access without having access to unencrypted data (e.g., content, key information, etc.).

As indicated above, FIG. 3 is provided as an example. Other examples may differ from what is described with regard to FIG. 3.

FIG. 4 is an illustration of an example process 400 associated with sharing access to data externally, according to various aspects of the present disclosure. In some aspects, the process 400 may be performed by respective memories and respective processors/controllers (e.g., processor 106, processor 720) associated with one or more user devices (e.g., user device 102) executing respective client applications and/or by a memory and/or a processor/controller (e.g., processing unit 112, processor 720) associated with a stateless infrastructure (e.g., stateless infrastructure 110). As shown by reference numeral 410, process 400 may include determining, by a first device, encrypted content based at least in part on utilizing a symmetric key to encrypt content. For instance, a first user device and/or the stateless infrastructure may utilize the associated processor/controller to determine encrypted content based at least in part on utilizing a symmetric key to encrypt content, as discussed elsewhere herein.

As shown by reference numeral 420, process 400 may include determining, by the first device, a sharing link to be utilized by a second device to obtain access to the encrypted content, the sharing link including a static portion to indicate an endpoint capable of providing the second device with access to the encrypted content and a dynamic portion including a unique content identifier to identify the encrypted content. For instance, the first user device and/or the stateless infrastructure may utilize the associated processor/controller to determine a sharing link to be utilized by a second device to obtain access to the encrypted content, the sharing link including a static portion to indicate an endpoint capable of providing the second device with access to the encrypted content and a dynamic portion including a unique content identifier to identify the encrypted content, as discussed elsewhere herein.

As shown by reference numeral 430, process 400 may include transmitting, by the first device to the second device, the sharing link to enable the second device to obtain access to the encrypted content. For instance, the first user device and/or the stateless infrastructure may utilize an associated communication interface (e.g., communication interface 770) along with the associated processor/controller to transmit, to the second device, the sharing link to enable the second device to obtain access to the encrypted content, as discussed elsewhere herein.

As shown by reference numeral 440, process 400 may include transmitting, by the second device to the endpoint, a request to access the encrypted content, the request being routed to the endpoint based at least in part on the static portion. For instance, a second user device (e.g., external user device) and/or the stateless infrastructure may utilize an associated communication interface (e.g., communication interface 770) along with the processor/controller to transmit, to the endpoint, a request to access the encrypted content, the request being routed to the endpoint based at least in part on the static portion, as discussed elsewhere herein.

As shown by reference numeral 450, process 400 may include receiving, by the second device, access to the encrypted content based at least in part on transmitting the request. For instance, the second user device and/or the stateless infrastructure may utilize the associated communication interface and processor/controller to receive access to the encrypted content based at least in part on transmitting the request, as discussed elsewhere herein.

Process 400 may include additional aspects, such as any single aspect or any combination of aspects described below and/or in connection with one or more other processes described elsewhere herein.

In a first aspect, in process 400, the sharing encryption key is symmetric with the sharing decryption key.

In a second aspect, alone or in combination with the first aspect, process 400 may include determining, by the first device, a virtual assigned public key and a virtual assigned private key; encrypting, by the first device, the symmetric key based at least in part on utilizing the virtual assigned public key; and encrypting, by the first device, the symmetric key based at least in part on utilizing a virtual master key based at least in part on a virtual master string of alphanumeric characters.

In a third aspect, alone or in combination with the first through second aspects, process 400 may include determining, by the second device, a virtual master key based at least in part on a received virtual master string of alphanumeric characters; decrypting, by the second device, a virtual assigned private key by utilizing the master key; decrypting, by the second device, the symmetric key by utilizing the virtual assigned private key, the symmetric key being encrypted by utilizing a virtual assigned public key; and decrypting the encrypted content by utilizing the symmetric key.

In a fourth aspect, alone or in combination with the first through third aspects, in process 400, the dynamic portion is associated with a point in time when the sharing link is determined.

In a fifth aspect, alone or in combination with the first through fourth aspects, in process 400, the dynamic portion is associated with a point in time before which the sharing link is to be utilized to access the encrypted content.

In a sixth aspect, alone or in combination with the first through fifth aspects, in process 400, the dynamic portion includes a unique recipient identifier to identify the device.

In a seventh aspect, alone or in combination with the first through sixth aspects, in process 400, the dynamic portion includes a hash of the unique content identifier and a unique recipient identifier to identify the device or a hash of the unique content identifier and a timestamp.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with sharing access to data externally, according to various aspects of the present disclosure. In some aspects, the process 500 may be performed by a memory and/or a processor/controller (e.g., processor 106, processor 720) associated with an external user device (e.g., user device 102) executing a client application and/or by a memory and/or a processor/controller (e.g., processing unit 112, processor 720) associated with a stateless infrastructure (e.g., stateless infrastructure 110). As shown by reference numeral 510, process 500 may include receiving, by a device, a sharing link to be utilized by the device to obtain access to encrypted content, the sharing link including a static portion and a dynamic portion. For instance, the user device and/or the stateless infrastructure may utilize an associated communication interface (e.g., communication interface 770) along with the associated memory and processor to receive a sharing link to be utilized by the device to obtain access to encrypted content, the sharing link including a static portion and a dynamic portion, as discussed elsewhere herein.

As shown by reference numeral 520, process 500 may include transmitting, by the device, a request to access the encrypted content, the request being routed based at least in part on the static portion and the request identifying the encrypted content in the dynamic portion. For instance, the user device and/or the stateless infrastructure may utilize the associated communication interface and processor to transmit a request to access the encrypted content, the request being routed based at least in part on the static portion and the request identifying the encrypted content in the dynamic portion, as discussed elsewhere herein.

As shown by reference numeral 530, process 500 may include receiving, by the device, access to the encrypted content based at least in part on transmitting the request. For instance, the user device and/or the stateless infrastructure may utilize the associated communication interface and processor to receive access to the encrypted content based at least in part on transmitting the request, as discussed elsewhere herein.

Process 500 may include additional aspects, such as any single aspect or any combination of aspects described below and/or in connection with one or more other processes described elsewhere herein.

In a first aspect, process 500 may include receiving a virtual master string of alphanumeric characters; and determining a master key based at least in part on the virtual master string to enable the device to decrypt the encrypted content.

In a second aspect, alone or in combination with the first aspect, process 500 may include determining a master key based at least in part on a received master string of alphanumeric characters; and decrypting a virtual assigned private key by utilizing the master key to enable the device to decrypt the encrypted content.

In a third aspect, alone or in combination with the first through second aspects, process 500 may include determining a master key based at least in part on a received master string of alphanumeric characters; decrypting a virtual assigned private key by utilizing the master key; decrypting, by utilizing the virtual assigned private key, a symmetric key utilized to encrypt content to determine the encrypted content; and decrypting the encrypted content by utilizing the symmetric key.

In a fourth aspect, alone or in combination with the first through third aspects, in process 500, the dynamic portion is associated with a point in time when the sharing link is determined.

In a fifth aspect, alone or in combination with the first through fourth aspects, in process 500, the dynamic portion is associated with a point in time before which the sharing link is to be utilized to access the encrypted content.

In a sixth aspect, alone or in combination with the first through fifth aspects, in process 500, the dynamic portion includes a unique recipient identifier to identify the device.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with sharing access to data externally, according to various aspects of the present disclosure. In some aspects, the process 600 may be performed by a memory and a processor/controller (e.g., processing unit 106, processor 720) associated with a user device (e.g., user device 102) executing a client application and/or by a memory and/or a processor/controller (e.g., processing unit 112, processor 720) associated with a stateless infrastructure (e.g., stateless infrastructure 110). As shown by reference numeral 610, process 600 may include transmitting, by a device, encrypted content to an endpoint capable of managing access to the encrypted content. For instance, the user device and/or the stateless infrastructure may utilize a communication interface (e.g., communication interface 770) along with the associated processor/controller to transmit encrypted content to an endpoint capable of managing access to the encrypted content, as discussed elsewhere herein.

As shown by reference numeral 620, process 600 may include determining, by the device, a sharing link including a static portion and a dynamic portion, the static portion being associated with the endpoint and the dynamic portion including a unique identifier associated with the encrypted content. For instance, the user device and/or the stateless infrastructure may utilize the associated processor/controller to determine a sharing link including a static portion and a dynamic portion, the static portion being associated with the endpoint and the dynamic portion including a unique identifier associated with the encrypted content, as discussed elsewhere herein.

As shown by reference numeral 630, process 600 may include transmitting, by the device, the dynamic portion of the sharing link to the endpoint to enable the endpoint to provide another device with access to the encrypted content. For instance, the user device and/or the stateless infrastructure may utilize the associated communication interface and the processor/controller to transmit the dynamic portion of the sharing link to the endpoint to enable the endpoint to provide another device with access to the encrypted content, as discussed elsewhere herein.

Process 600 may include additional aspects, such as any single aspect or any combination of aspects described below and/or in connection with one or more other processes described elsewhere herein.

In a first aspect, process 600 may include determining the encrypted content based at least in part on utilizing a symmetric key to encrypt content.

In a second aspect, alone or in combination with the first aspect, process 600 may include transmitting, by the device to the other device, the sharing link to enable the other device to access the encrypted content.

In a third aspect, alone or in combination with the first through second aspects, in process 600, the static portion may include information associated with the endpoint to enable a request for access to the encrypted content to be routed to the endpoint over a network.

In a fourth aspect, alone or in combination with the first through third aspects, in process 600, the dynamic portion is associated with a point in time when the sharing link is determined.

In a fifth aspect, alone or in combination with the first through fourth aspects, in process 600, the dynamic portion is associated with a point in time before which the sharing link is to be utilized to access the encrypted content.

In a sixth aspect, alone or in combination with the first through fifth aspects, in process 600, the dynamic portion includes a unique recipient identifier to identify the other device.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700 associated with sharing access to data externally, according to various aspects of the present disclosure. In some aspects, the example devices 700 may form part of or implement the systems, environments, infrastructures, components, devices, or the like described elsewhere herein (e.g., FIGS. 1-3) and may be used to perform the example processes described elsewhere herein. The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a receiving device from a transmitting device, a sharing link to be utilized by the receiving device to obtain access to encrypted content that is stored in a storage device, the sharing link including static portion information to enable the receiving device to reach the storage device and dynamic portion information including an identifier that uniquely identifies the receiving device;
   transmitting, by the receiving device to the storage device based at least in part on utilizing the static portion information, a request to access the encrypted content; and
   receiving, by the receiving device from the storage device, access to the encrypted content based at least in part on a determination that the receiving device is an authorized recipient of the encrypted content, the determination being based at least in part on a comparison between the dynamic portion received by the receiving device and a stored dynamic portion that is stored in association with the encrypted content.

2. The method of claim 1, wherein transmitting the request includes transmitting the request based at least in part on utilizing a web browser.

3. The method of claim 1, wherein the static portion information is constant among sharing links associated with the encrypted content.

4. The method of claim 1, wherein the static portion information includes network routing information to enable the receiving device to reach the storage device over a network.

5. The method of claim 1, wherein the dynamic portion is different for different receiving devices that are to obtain access to the encrypted content.

6. The method of claim 1, wherein the dynamic portion includes encoded combined information determined based at least in part on hashing a combination of content information that uniquely identifies the encrypted content and the unique identifier that identifies the receiving device.

7. The method of claim 1, wherein the dynamic portion is associated with a point in time when the sharing link is determined or is associated with a point in time before which the sharing link is to be utilized to access the encrypted content.

8. A receiving device, comprising:
   a memory; and
   a processor communicatively coupled to the memory, the memory and the processor being configured to:
      receive, from a transmitting device, a sharing link to be utilized by the receiving device to obtain access to encrypted content that is stored in a storage device, the sharing link including static portion information to enable the receiving device to reach the storage device and dynamic portion information including an identifier that uniquely identifies the receiving device;
      transmit, to the storage device based at least in part on utilizing the static portion information, a request to access the encrypted content; and
      receive, from the storage device, access to the encrypted content based at least in part on a determination that the receiving device is an authorized recipient of the encrypted content, the determination being based at least in part on a comparison between the dynamic portion received by the receiving device and a stored dynamic portion that is stored in association with the encrypted content.

9. The device of claim 8, wherein, to transmit the request, the memory and the processor are configured to utilize a web browser.

10. The device of claim 8, wherein the static portion information is constant among sharing links associated with the encrypted content.

11. The device of claim 8, wherein the static portion information includes network routing information to enable the receiving device to reach the storage device over a network.

12. The device of claim 8, wherein the dynamic portion is different for different receiving devices that are to obtain access to the encrypted content.

13. The device of claim 8, wherein the dynamic portion includes encoded combined information determined based at least in part on hashing a combination of content information that uniquely identifies the encrypted content and the unique identifier that identifies the receiving device.

14. The device of claim 8, wherein the dynamic portion is associated with a point in time when the sharing link is determined or is associated with a point in time before which the sharing link is to be utilized to access the encrypted content.

15. A non-transitory computer-readable medium configured to store instructions, which when executed by a processor associated with a receiving device, configure the processor to:
    receive, from a transmitting device, a sharing link to be utilized by the receiving device to obtain access to encrypted content that is stored in a storage device, the sharing link including static portion information to enable the receiving device to reach the storage device and dynamic portion information including an identifier that uniquely identifies the receiving device;
    transmit, to the storage device based at least in part on utilizing the static portion information, a request to access the encrypted content; and
    receive, from the storage device, access to the encrypted content based at least in part on a determination that the receiving device is an authorized recipient of the encrypted content, the determination being based at least in part on a comparison between the dynamic portion received by the receiving device and a stored dynamic portion that is stored in association with the encrypted content.

16. The non-transitory computer-readable medium of claim 15, wherein, to transmit the request, the processor is configured to utilize a web browser.

17. The non-transitory computer-readable medium of claim 15, wherein the static portion information is constant among sharing links associated with the encrypted content.

18. The non-transitory computer-readable medium of claim 15, wherein the static portion information includes network routing information to enable the receiving device to reach the storage device over a network.

19. The non-transitory computer-readable medium of claim 15, wherein the dynamic portion is different for different receiving devices that are to obtain access to the encrypted content.

20. The non-transitory computer-readable medium of claim 15, wherein the dynamic portion includes encoded combined information determined based at least in part on hashing a combination of content information that uniquely identifies the encrypted content and the unique identifier that identifies the receiving device.

\* \* \* \* \*